United States Patent [19]

Shibuya et al.

[11] Patent Number: 5,579,416
[45] Date of Patent: Nov. 26, 1996

[54] CHARACTER PROCESSING APPARATUS FOR SELECTIVELY MODIFYING A FONT PATTERN

[75] Inventors: Yukari Shibuya, Kawasaki; Kunio Seto, Inagi; Masaki Hamada, Tokyo; Akifumi Shirasaka, Yokohama, all of Japan

[73] Assignee: Canon Kabushiki Kaisha, Tokyo, Japan

[21] Appl. No.: 247,418

[22] Filed: May 23, 1994

Related U.S. Application Data

[63] Continuation of Ser. No. 924,784, Aug. 4, 1992, abandoned, which is a continuation of Ser. No. 666,439, Mar. 11, 1991, abandoned, which is a continuation of Ser. No. 217,881, filed as PCT/JP87/00824, Oct. 27, 1987, abandoned.

[30] Foreign Application Priority Data

Oct. 27, 1986 [JP] Japan .................................. 61-253664
Oct. 27, 1986 [JP] Japan .................................. 61-255123

[51] Int. Cl.$^6$ ................................................. G06K 9/00
[52] U.S. Cl. .......................... 382/293; 382/301; 395/167; 345/143
[58] Field of Search ................................ 382/41, 44, 57, 382/21, 22, 293, 298, 301, 266; 395/150, 151, 156; 345/17, 26, 128, 143, 144, 146

[56] References Cited

U.S. PATENT DOCUMENTS

| Re. 30,679 | 7/1981 | Evans et al. | 364/523 |
|---|---|---|---|
| 4,156,915 | 5/1979 | Hasenbalg et al. | 364/521 |
| 4,193,119 | 3/1980 | Arase et al. | 364/900 |
| 4,429,306 | 1/1984 | Macauley et al. | 340/790 |
| 4,594,674 | 6/1986 | Boulia et al. | 364/523 |
| 4,675,830 | 6/1987 | Hawkins | 364/518 |
| 4,682,189 | 7/1987 | Purdy et al. | 364/521 |
| 4,686,522 | 8/1987 | Hernandez et al. | 340/723 |
| 4,701,752 | 10/1987 | Wang | 340/723 |
| 4,745,561 | 5/1988 | Hirosawa et al. | 340/735 |
| 4,789,855 | 12/1988 | Ozeki | 340/709 |
| 4,817,172 | 3/1989 | Cho | 382/21 |
| 4,827,254 | 5/1989 | Nishiyama | 340/790 |
| 4,873,643 | 10/1989 | Powell et al. | 395/156 |
| 4,896,291 | 1/1990 | Gest et al. | 340/735 |
| 5,107,259 | 4/1992 | Weitzen et al. | 340/735 |

FOREIGN PATENT DOCUMENTS

| 53-15624 | 5/1978 | Japan | G06K 15/20 |
|---|---|---|---|
| 53-41017 | 10/1978 | Japan | G06K 15/20 |

OTHER PUBLICATIONS

Microsoft Works Wordprocessing Program and Documentation Doc #EB0203-20A-R01-0189 (1986), pp. 64-71, 94-95.

Primary Examiner—Leo Boudreau
Assistant Examiner—Andrew W. Johns
Attorney, Agent, or Firm—Fitzpatrick, Cella, Harper & Scinto

[57] ABSTRACT

A character processing apparatus comprises: parameter memory means for storing type parameters; display means for displaying a list of a plurality of type vector fonts on the basis of the type parameters; selecting means for selecting a plurality of type vector fonts displayed by the display means; and converting means for converting each of the vector fonts existing in a designated interval in a vector font train which are input from input means and displayed by the display means into the type vector fonts selected by the selecting means, wherein the modified vector fonts which are frequently used and correspond to fundamental vector fonts are previously registered, and when modified vector font patterns are formed, the registered modified vector font patterns are displayed and selected, thereby enabling the parameters for the modified vector font patterns to be easily set.

54 Claims, 15 Drawing Sheets

FIG. 3A

25a

| | 32 | | | | |
|---|---|---|---|---|---|
| CONTOUR | (STANDARD) | | HATCHING | OUTLINE | |
| | | | WHITE (BLACK) GRAY | WHITE BLACK | |
| | BOLD | | HATCHING | PERCENTAGE | |
| | | | WHITE BLACK GRAY | °/₀ | |
| | TILTED | | HATCHING | PERCENTAGE | ANGLE |
| | | | WHITE BLACK GRAY | °/₀ | +5° IN X-DIRECTION |
| SHADOW | CONTINUOUS | A | HATCHING | SHADOW | |
| | | | WHITE BLACK GRAY | °/₀ | |
| | | B | HATCHING | SHADOW | |
| | | | WHITE BLACK GRAY | °/₀ | |
| | DIS-CONTINUOUS | A | HATCHING | SHADOW | |
| | | | WHITE BLACK GRAY | °/₀ | |
| | | B | HATCHING | SHADOW | |
| | | | WHITE BLACK GRAY | °/₀ | |

33

25p

| 32 | | | | | |
|---|---|---|---|---|---|
| CONTOUR | (STANDARD) | | HATCHING | OUTLINE | |
| | | | (WHITE) BLACK GRAY | WHITE (BLACK) | |
| | BOLD | | HATCHING | PERCENTAGE | |
| | | | WHITE BLACK GRAY | % | |
| | TILTED | | HATCHING | PERCENTAGE | ANGLE |
| | | | WHITE BLACK GRAY | % | + ° IN X-DIRECTION |
| SHADOW | (CONTINUOUS) | Ⓐ | HATCHING | SHADOW | |
| | | | WHITE BLACK (GRAY) | 40 % | |
| | | Ⓑ | HATCHING | SHADOW | |
| | | | WHITE (BLACK) GRAY | 40 % | |
| | DIS-CONTINUOUS | A | HATCHING | SHADOW | |
| | | | WHITE BLACK GRAY | % | |
| | | B | HATCHING | SHADOW | |
| | | | WHITE BLACK GRAY | % | |

33

25t

| 32 | | | | | |
|---|---|---|---|---|---|
| CONTOUR | STANDARD | | HATCHING | OUTLINE | |
| | | | WHITE BLACK GRAY | WHITE BLACK | |
| | (BOLD) | | HATCHING | PERCENTAGE | |
| | | | WHITE (BLACK) GRAY | 20 % | |
| | TILTED | | HATCHING | PERCENTAGE | ANGLE |
| | | | WHITE BLACK GRAY | % | + ° IN X-DIRECTION |
| SHADOW | CONTINUOUS | A | HATCHING | SHADOW | |
| | | | WHITE BLACK GRAY | % | |
| | | B | HATCHING | SHADOW | |
| | | | WHITE BLACK GRAY | % | |
| | DIS-CONTINUOUS | A | HATCHING | SHADOW | |
| | | | WHITE BLACK GRAY | % | |
| | | B | HATCHING | SHADOW | |
| | | | WHITE BLACK GRAY | % | |

33

(A) あなたはネガ派？
    それともリバーサル派？

(B) あなたはネガ派？
    それともリバーサル派？

(C) あなたはネガ派？
    それともリバーサル派？

(D) あなたはネガ派？
    それともリバーサル派？

|  | X-DIRECTION | Y-DIRECTION |
|---|---|---|
| MAGNIFICATION | x 1 | x 2.0 |

|  | X-DIRECTION | Y-DIRECTION |
|---|---|---|
| MAGNIFICATION | x 1 | x 0.65 |

|  | X-DIRECTION | Y-DIRECTION |
|---|---|---|
| MAGNIFICATION | x 2 | x 1 |

|  | X-DIRECTION | Y-DIRECTION |
|---|---|---|
| MAGNIFICATION | x 0.65 | x 1 |

|  | X-DIRECTION | Y-DIRECTION |
|---|---|---|
| MAGNIFICATION | x 2 | x 2 |

|  | X-DIRECTION | Y-DIRECTION |
|---|---|---|
| MAGNIFICATION | x 0.65 | x 0.65 |

CHARACTER PROCESSING APPARATUS FOR SELECTIVELY MODIFYING A FONT PATTERN

This application is a continuation of application Ser. No. 07/924,784 filed Aug. 4, 1992, now abandoned, which is a continuation of application Ser. No. 07/666,439 filed Mar. 11, 1991, abandoned, which is a continuation of application Ser. No. 07/217,881, filed as PCT/JP87/00824, Oct. 27, 1987, abandoned.

TECHNICAL FIELD

The present invention relates to a character processing apparatus in which vector font data is stored in an auxiliary memory device or the like and the vector font corresponding to an input character is read out of the auxiliary memory device and output.

BACKGROUND ART

In such a kind of apparatus, in general, a font such as italic, bold, or the like is selected and a character which is input by a key is input as a type to the apparatus. Further, as an apparatus which can output a desired character at a high quality, there has been proposed an apparatus in which characters corresponding to a character train which are input from an input section, for example, vector fonts are read out of the auxiliary memory device or the like and displayed or output as an image.

On the other hand, in an apparatus having vector fonts, the vector font corresponding to one character which is fundamentally prepared can be variably magnified (enlarged or reduced) to various sizes and output or can be modified and output. Such an apparatus is shown in, e.g., Japanese Patent Application No. 60-87516 (U.S. Ser. No. 854,193 filed Apr. 21, 1986) and Japanese Patent Application No. 60-222937 (U.S. Ser. No. 914,733 filed Oct. 2, 1986). Further, there is also proposed an apparatus in which once a vector font has been set to specified coordinates, the vector font having a synthetic shadow effect by painting, blanking, and various kinds of hatching patterns (line shadow, irregular pattern) can be output (refer to Japanese Patent Application No. 60-222938 (U.S. Ser. No. 914,150 filed Oct. 1, 1986)).

However, in the modified outputs of the vector font as mentioned above, it is necessary to set various parameters to the contour process and shadow process for one character.

FIG. 6 is a diagrammatical view for explaining a screen to set the foregoing vector font parameters.

In this diagram, reference numeral 31 denotes a vector font (which reads "ji" and means "character") which is constituted by contour process information 32, shadow information 33, and the like. The contour process information 32 comprises: type parameters 34a to 34c; hatching parameters 35a to 35c; an outline parameter 36; a bold amount parameter 37; a flat amount parameter 38; a tilt amount parameter 39; and the like. The shadow information 33 comprises a continuous parameter 40, a discontinuous parameter 41, and the like. The shadow parameter consists of a hatching parameter 42a, a shadow amount parameter 42b, and the like.

To display the vector font 31, after the type parameters 34a and 34c were instructed by input means, the hatching parameter 35a is set to white, the hatching parameter 35c is set to gray, the outline parameter 36 is set to black, the flat amount parameter 38 is set to 60%, and the tilt amount parameter 39 is set to +15° in the x-direction. After completion of these designating processes, the vector font is generated.

As explained above, a desired vector font modification cannot be performed unless various necessary parameters are set. Therefore, with reference to a manual, an operator needs to successively designate the parameters of percentages of enlargement and reduction, tilting direction, tilt percentage, and the like, the painting, blanking, and hatching patterns, and parameters of angle, width, and the like of a shadow. There is a problem such that these designating operations are troublesome even for an experienced operator. On the other hand, there is a case where the sense of design is necessary to set the parameters. In such a case, there is a problem such that an unexperienced operator can generate a vector font which meets the final image only after he repeated the trial and error.

On the other hand, as a feature of vector fonts, figure or character data can be fundamentally arbitrarily changed. For example, a character size can be modified for enlargement, reduction, elongation, widening, or the like and the resultant character can be output. However, for example, in order to magnify the character data which has once been input at a certain character size, the character size needs to be set every time by a method whereby, for example, an enlargement or reduction percentage or a long size or flat size percentage is input by keys or the like. On the other hand, in most of ordinary word processors, only fixed modifications such as four-time enlargement, vertically-double enlargement, and the like can be realized.

Therefore, when an operator wants to magnify existing character data to an arbitrary size, he must presume the magnification corresponding to a desired size and then set it.

An example is shown. As shown in FIG. 7A, it is assumed that character data of 64 points (which reads "kin-en" and means "No smoking") is written in a rectangle. When the character in this rectangle is to be reduced to fit in a rectangle of a size as shown in FIG. 7E, the operator presumes that the magnification of the character data which will be written in the rectangle of FIG. 7E will be 0.80 times in both of the directions of x and y axes as reproduced in FIG. 7B. Then, the operator inputs and sets this magnification by using a keyboard. However, since the characters are too large (FIG. 7B), the operator resets the magnification to 0.70 time in both of the directions of x and y axes as shown in FIG. 7C in a manner similar to the above. However, since the characters are too small in this case, the magnification is reset to 0.75 times in both directions of x and y axes as shown in FIG. 7D. Finally, the character data of the desired size is obtained. Although not shown, each time-such operations are executed, it is necessary to perform a plurality of operations to access a window for setting the magnification, to input the magnification by the keys, and the like.

In this manner, in order to magnify the character data to an arbitrary size, the character data of an object size cannot be derived if trial and error are not repeated.

DISCLOSURE OF THE INVENTION

The present invention is made to solve the foregoing problems. It is an object of the present invention to obtain a character processing apparatus in which modified vector fonts which are frequently used in correspondence to fundamental vector fonts are previously registered, and when a modified vector font pattern is formed, the registered modified vector font patterns are displayed and a desired pattern is selected, thereby enabling the parameter for the modified vector font pattern to be easily set.

For this purpose, according to the invention, there are provided: parameter memory means for storing type parameters to generate a plurality of type vector fonts; display means which can display a list of those plurality of type vector fonts on the basis of the type parameters stored in the parameter memory means; selecting means for selecting the plurality of type vector fonts displayed by the display means; and converting means for converting each vector font existing in a designated interval in the vector font train which are input from input means and displayed by the display means into the type vector fonts selected by the selecting means.

Another object of the invention is to allow the display means to display a list of a plurality of type fonts which can be used. For this purpose, when an arbitrary type font is selected and the interval adapted to change the type in the character train which is input from input means is designated, the vector font type in the designated interval is converted by converting means and displayed.

Still another object of the invention is to enable parameters which are necessary for magnification to be easily set. For this purpose, an arbitrary figure/character size can be promptly output without losing various kinds of modifications (for example, tilting, painting, blanking, hatching pattern, shadow, and the like) as features of vector fonts.

Still another object of the invention is to provide a character processing apparatus which can easily variably modify selected type fonts.

Still another object of the invention is to select standard modification examples of vector fonts by simple operations and to subsequently perform a correction, thereby easily obtaining a desired pattern.

BRIEF DESCRIPTION OF THE DRAWINGS

FIGS. 3(a) to 3(c) are diagrammatical views for explaining parameters corresponding to the type fonts shown in FIG. 2(a)

BEST MODE FOR CARRYING OUT THE INVENTION

Figure 1A:
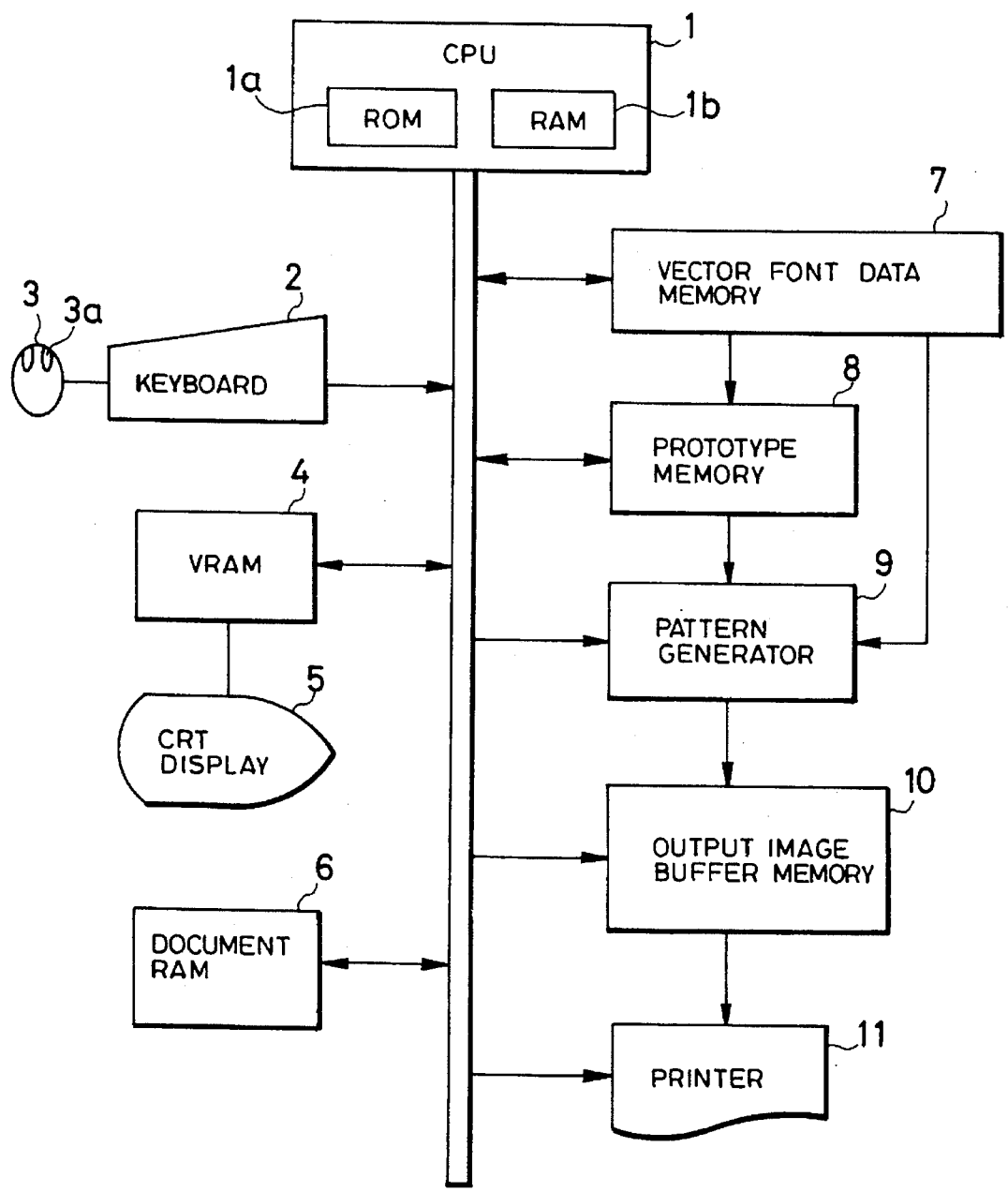
FIG. 1(a) is a block diagram for explaining an arrangement of a character processing apparatus showing an embodiment of the present invention.

FIG. 1(a) is a block diagram for explaining an arrangement of a character processing apparatus showing an embodiment of the present invention. A CPU 1 integrally controls each section on the basis of control programs (according to flowcharts shown in FIGS. 5 and 8) which are stored in an ROM 1a. RAM 1b functions as a work memory. A keyboard 2 serving as input means inputs a character train as a document and instructs control information to the CPU 1. A pointing device 3 indicates a plurality of modified vector fonts which are displayed on a CRT display 5 serving as a display device to thereby select them and also instructs a vector font modifying area in the character train input by the keyboard 2. The pointing device 3 also serves as selecting means in the invention. A clock button 3a is provided in the pointing device 3. Data to be displayed on the CRT display 5 is stored into a bit map in a video RAM (VRAM) 4. A document RAM 6 stores document data (including figure and image data) during the document editing. A vector font data memory 7 stores the vector font data of each character. A prototype memory 8 serving as parameter memory means in the invention stores a plurality of, e.g., twenty type vector fonts (prototypes) shown in FIG. 2a. A rewritable area to store parameters corresponding to the type vector fonts which can be registered by a user is prepared in the prototype memory 8. A pattern generator 9 serves as converting means in the invention. When character data in the vector font data memory 7 or a prototype designation is instructed form the CPU 1, the character data which is read out of the vector font data memory 7 on the basis of the parameter stored in the prototype memory 8 is converted into the vector font of the instructed type by the pattern generator 9 and displayed on the CRT display 5. An output image buffer memory 10 stores image data which is output to a printer 11 which is constituted by, e.g., a laser beam printer.

Figure 1B:
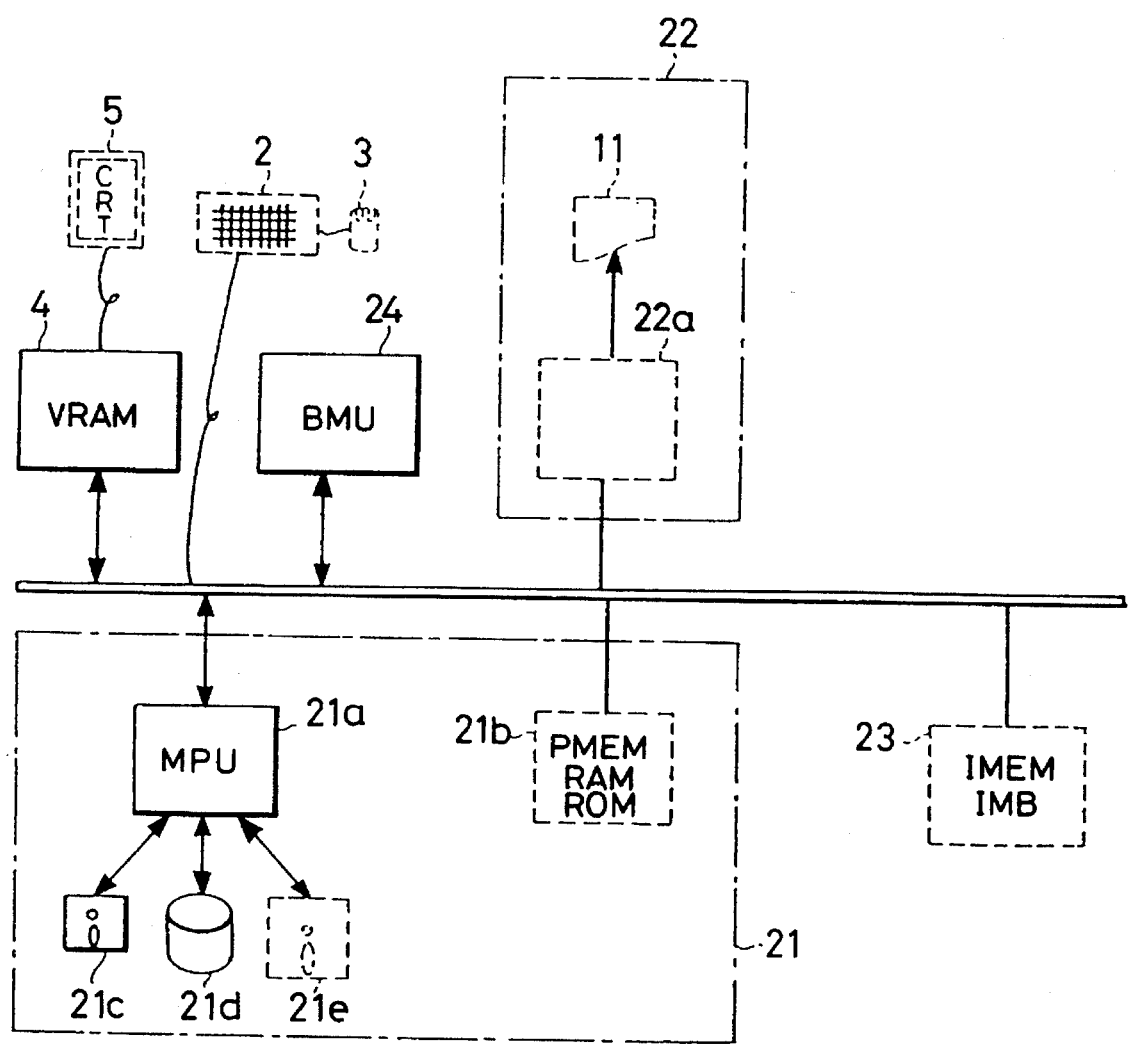
FIG. 1(b) is a system arrangement diagram for explaining an arrangement of a character processing system having the character processing apparatus shown in FIG. 1(a)

FIG. 1(b) is a system arrangement diagram for explaining an arrangement of a character processing system having the character processing apparatus shown in FIG. 1(a). The same parts and components as those in FIG. 1(a) are designated by the same reference numerals.

In this diagram, a microcomputer 21 to control the system comprises: an MPU 21a; an internal memory 21b; a floppy disk 21c of five inches serving as an external memory; a hard disk 21d; a floppy disk 21e of eight inches; and the like. An output section 22 has an interface circuit 22a to supply image data to the printer 11. An image memory (IMEM) 23 consists of an output image buffer memory 10 or the like and stores the image data which is transmitted to the printer 11. A bit movement unit (BMU) 24 controls the movement and rotation of the image data.

Figure 2A:
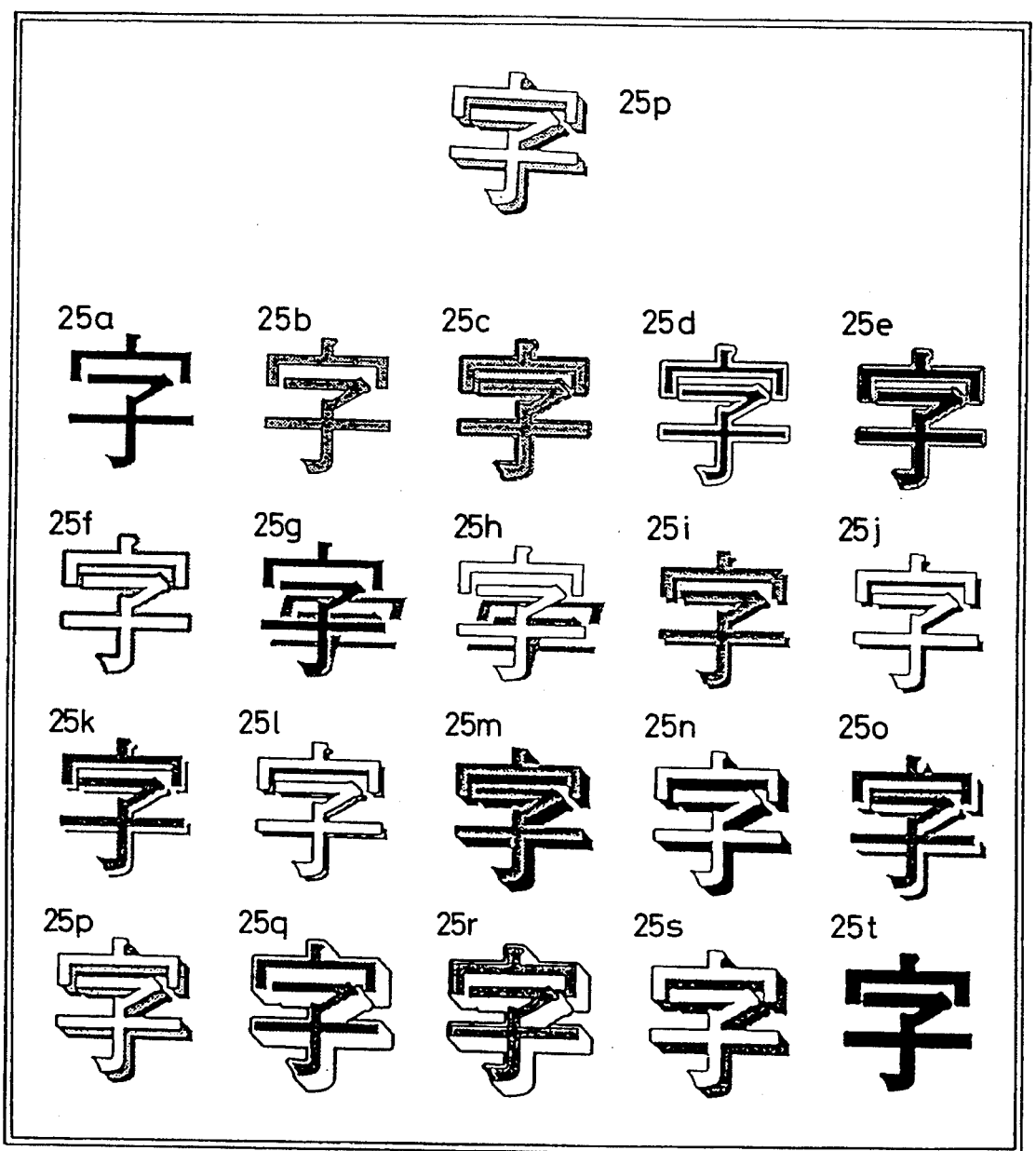
FIG. 2(a) is a diagrammatical view for explaining a plurality of type vector fonts which are generated from a pattern generator shown in FIG. 1.

FIG. 2(a) is a diagrammatical view for explaining a plurality of type vector fonts (which read "ji" and mean "character") which are generated from the pattern generator shown in FIG. 1(a). The same parts and components as those in FIG. 1(a) are designated by the same reference numerals.

Figure 2B:
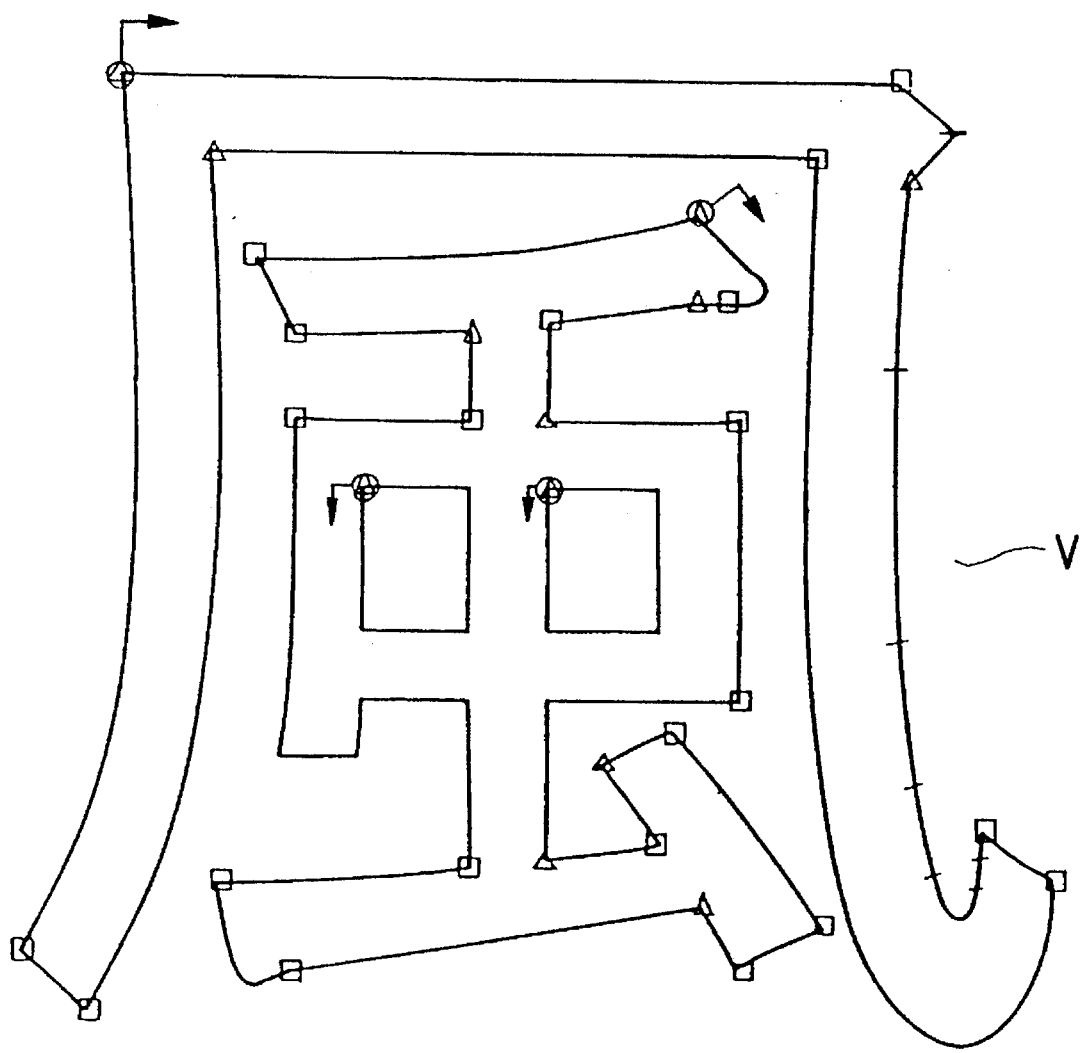
FIG. 2(b) is a diagrammatical view for explaining vector font data.

In this diagram, reference numerals 25a to 25t denote type fonts which are displayed as a list of graphic patterns on the CRT display 5. Each of the type fonts 25a to 25t consists of vector data V (in the diagram, in the case of a character "風" (which reads "kaze" and means "wind")) as shown in FIG. 2(b) which is composed of main points of contours. The term "vector font" in this invention is similar to stroke font, contour font, outline font, or the like in terms of language. However, practically speaking, a character or figure is expressed by a plurality of sampling points as shown in FIG. 2 and actually consists of the coordinate points such as (x, y)=200, 100, 300, 140, . . . and data indicative of character frame size, start/stop of curve, inner contour, outer contour, and the like. These data are stored into the vector font data memory 7. For example, this diagram illustrates a state in which the type font 25p is selected and instructed by the pointing device 3 and the selected type font 25p is representatively displayed.

Figure 3B:
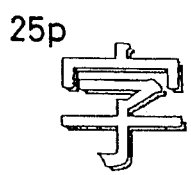
Figure 3C:
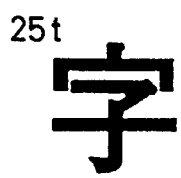
Figure 6:
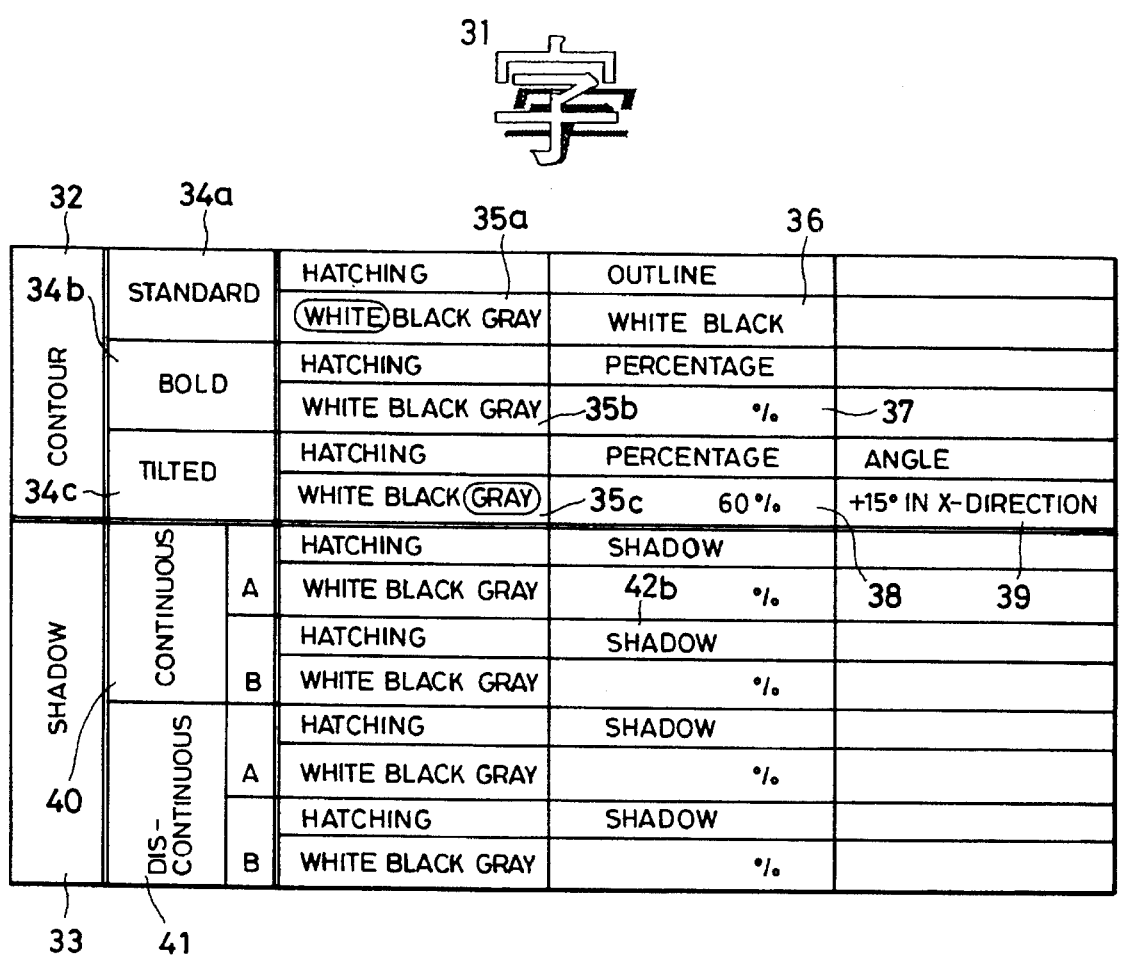
FIG. 6 is a diagrammatical view for explaining a conventional vector font parameter setting picture plane.
Figure 7:
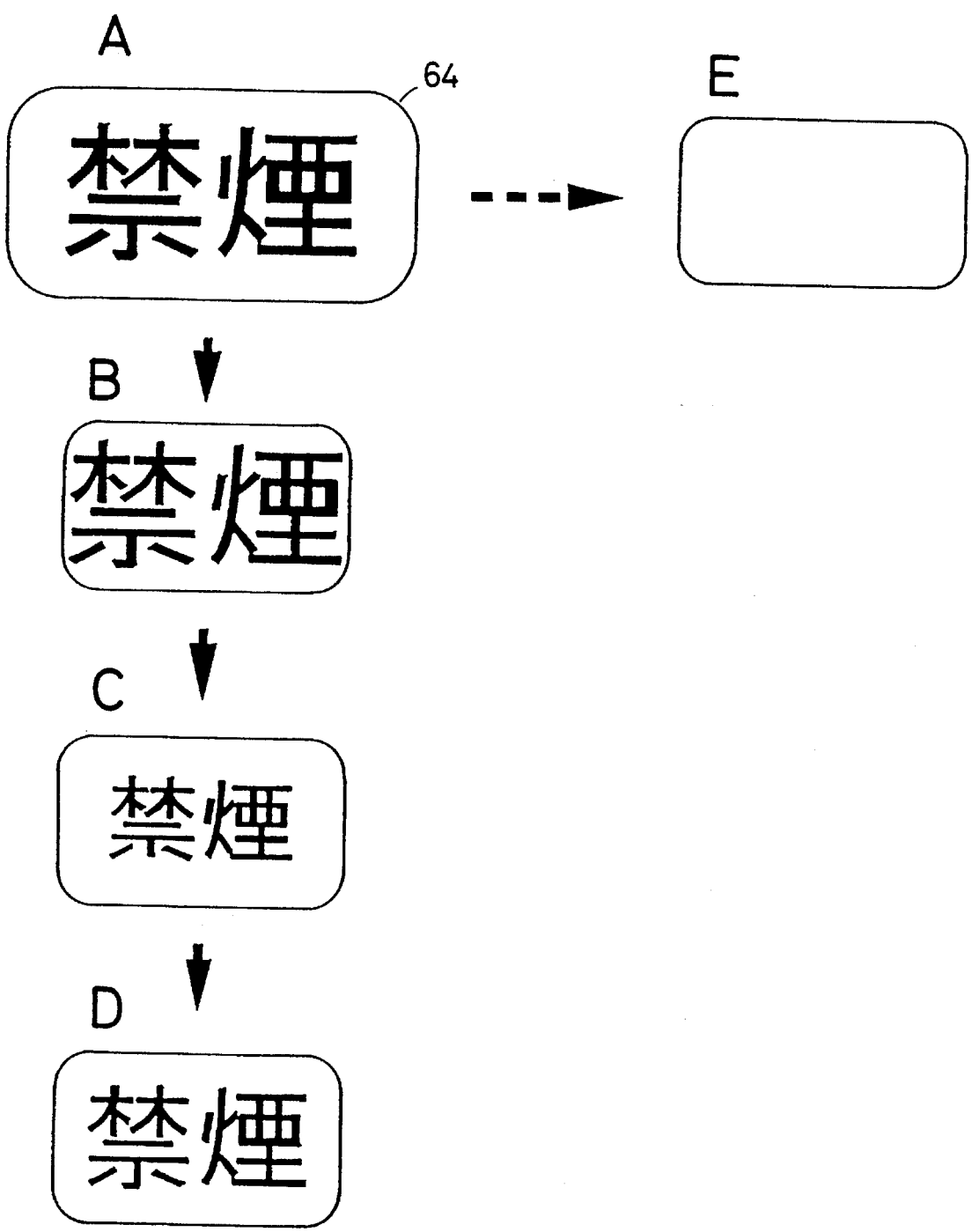
FIGS. 7A to 7E are explanatory diagrams of a conventional example.

FIGS. 3(a) to 3(c) are diagrammatical views for explaining parameters corresponding to the type fonts 25a, 25p, and 25t shown in FIG. 2(a). The same parts and components as those shown in FIG. 6 are designated by the same reference numerals.

As will be obvious from these diagrams, when the display of a type font definition picture plane is requested by the pointing device 3, the parameters which are stored in the prototype memory 8 are read out, the pattern generator 9 is accessed, and the type fonts 25a to 25t shown in FIG. 2(a) are displayed as a list on the CRT display 5. When the display of the type font definition picture plane is not requested by the pointing device 3, the character train which are input by the keyboard 2 may be also constituted so as to automatically set the parameter such as to generate the vector font corresponding to, e.g., the type font 25a. In this case, the parameter corresponding to the type font 25a, i.e., the parameter shown in FIG. 3(b) is automatically set.

On the other hand, when the display of the type font definition picture plane is requested by the pointing device 3, the parameters which are stored into the prototype memory 8 are read out, the pattern generator 9 is accessed, and the type fonts 25a to 25t shown in FIG. 2(a) are displayed as a list on the CRT display 5. At this stage, for example, when the type font 25p is indicated by the pointing device 3, the selected type font 25p is displayed on the CRT display 5 as shown in FIG. 2(a). At this time, various parameters shown in FIG. 3(b) are read out of the prototype memory 8 and transmitted to the pattern generator 9. On the other hand, when the display of the type font definition picture plane is requested by the pointing device 3, the parameters which are stored into the prototype memory 8 are read out, the pattern generator 9 is accessed, and the type fonts 25a to 25t shown in FIG. 2(a) are displayed as a list on the CRT display 5. At this stage, for example, when the type font 25t is indicated by the pointing device 3, the selected type font 25t is displayed on the CRT display 5. At this time, various parameters shown in FIG. 3(c) are read out of the prototype memory 8 and transmitted to the pattern generator 9.

FIGS. 4(a) to 4(d) are diagrammatical views for explaining the character train editing operation according to the invention. FIG. 4(a) shows a state in which the character train "あなたは ネガ派? それとも リバーサル派?" (which reads "anatawa negaha? soretomo ribahsaruha?" and means "Would you like negatives or reversals?") which are input by the keyboard 2 shown in FIG. 1(a) are displayed by the type font 25a. FIG. 4(b) shows a state in which the character train, namely, "ネガ派? リバーサル派?" ("negatives or reversals?") which are indicated by the pointing device 3 in the character train shown in FIG. 4(a) are displayed by the type font 25h. FIG. 4(c) shows a state in which the character train, namely, "ネガ派? リバーサル派?" ("negatives or reversals?") which are indicated by the pointing device 3 in the character train shown in FIG. 4(a) are displayed by the type font 25p. FIG. 4(d) shows a state in which the character train, namely, "ネガ派? リバーサル派?" ("negatives or reversals?") which are indicated by the pointing device 3 in the character train shown in FIG. 4(a) are displayed by the type font 25t.

The type font change display controlling operations according to the invention will now be described with reference to a flowchart shown in FIG. 5.

Figure 5:
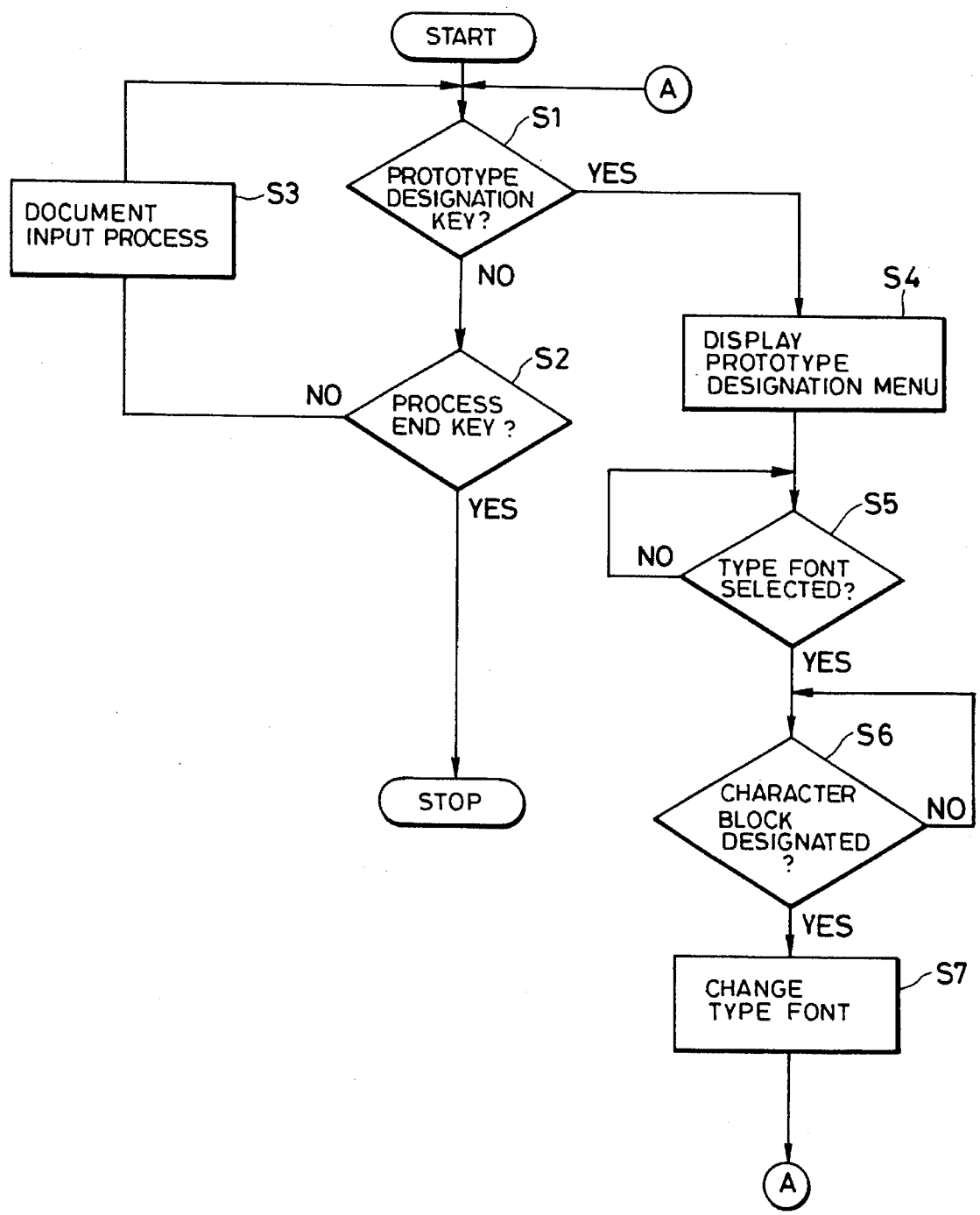
FIG. 5 is a flowchart for explaining type font change display controlling operations according to the invention.

FIG. 5 is a flowchart for explaining the type font change display controlling operations according to the invention.

First, a check is made by the CPU 1 to see if the key depressed on the keyboard 2 is a prototype designation key (not shown) or not (step S1). If NO, a check is made to see if the depressed key is a process end key or not (step S2). If YES, the control is finished. If NO, the process to input the character train, i.e., document which is input from the keyboard 2 is executed (step S3) and the processing routine is returned to step (S1).

On the other hand, if YES in the discrimination in step (S1), the prototype designation picture plane shown in FIG. 2 is displayed on the CRT display 5 (step S4). Next, the system waits until the type font is selected by the pointing device 3 (step S5). The selected type font is displayed on the CRT display 5. Next, the system waits until a range of the character train whose type font is changed is designated by the pointing device 3 (step S6). The type font of the character train in the range designated in step (S6), e.g., "ネガ派? リバーサル派?" ("negatives or reversals?") in the character train shown in FIG. 4(a) are changed to the type font selected in step (S5), e.g., 25p in step (S7). Then the processing routine is returned to step (S1).

Although long size, flat size, and tilted size (in the x direction + and −, and in the y direction + and −) as the type fonts have been omitted in the embodiment, these parameters can be also added to every type font.

On the other hand, in the embodiment, the case where the prototype designation picture plane shown in FIG. 2(a) is automatically displayed when the prototype designation key is depressed has been described. However, at this stage, it is also possible to constitute in a manner such that the mode can be switched so that the operator can select whether he uses the type font which has previously been formed or he newly sets an original parameter.

As described in detail above, according to the invention, the modified vector fonts which are frequently used in correspondence to the fundamental vector font are previously registered, and when a modified vector font pattern is formed, the registered modified vector font patterns are displayed and selected, thereby enabling the parameter corresponding to the modified vector font pattern to be simply set.

According to the invention, it is possible to provide a character processing apparatus comprising: parameter memory means for storing type parameters to generate a plurality of type vector fonts; display means which can display a list of the plurality of type vector fonts on the basis of the type parameters stored in the parameter memory means; selecting means for selecting the plurality of type vector fonts displayed by the display means; and converting means for converting each vector font existing in a designated interval in the vector font train which are input from input means and displayed by the display means into the type vector font selected by the selecting means.

According to the invention, it is possible to provide a character processing apparatus in which a plurality of type fonts which can be used are displayed as a list on display means, and when an arbitrary type font is selected and an interval to change the type is instructed in the character train which are input from input means, the vector font type in the designated interval can be converted by converting means and displayed.

Figure 4:
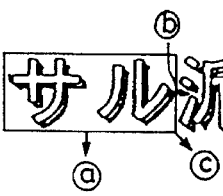
FIGS. 4(a) to 4(d) are diagrammatical views for explaining a character train editing operation according to the present invention.

In the constitution of the embodiment as mentioned above, the processes to change the selected type font or input character train as shown in FIG. 4 by a further simple operation will be described in accordance with a flowchart of FIG. 8.

In step S1.1, a check is made to see if data has been input from the keyboard 2 or pointing device 3. If NO, the processing routine is returned to step S1.1. If YES in step S1.1, step S1.2 follows and a check is made to see if a character correcting command has been input or not. If NO, step S2 follows and if the process end key has been input, the character inputting process is finished. If NO, step S3 follows and character(s) are input. The input character(s) are displayed by the CRT 5 in step S4 and thereafter, the processing routine is returned to step S1 and the system waits for the input. The input character codes and parameters regarding various kinds of editions are sequentially stored into the RAM 6 shown in FIG. 1(a).

If it is determined that the input has been performed by the key or pointing device 3 in step S1.1 and the character correction command has been input in step S1.2, step S5 follows. A check is made to see if the position pointed by the pointing device 3 in the input in step S1 is located on the character train or not. If NO, nothing is performed and step S1.1 follows. The system again waits for the input. In addition, it is also possible to constitute such that a plurality of character trains are specified by designating ranges.

If the position on the character train has been pointed in step S5, it is regarded that the process to magnify the character train has been designated in the character correction command. Thus, step S6 follows and a frame surrounding the character train and arrows in three directions of ⓐ, ⓑ, and ⓒ as shown in FIGS. 4(c) and 9 are displayed. An explanation will now be made hereinbelow on the basis of FIG. 9.

Next, step S7 follows and the system again waits for the input. To magnify, the cursor is moved in each direction of the arrows ⓐ, ⓑ, and ⓒ displayed in step S6 in a state in which the click button 3a of the pointing device 3 is successively depressed. (If the input is other than the successive depression on the arrows, the processing routine is returned to step S1.1) At this time, the magnification is set by the movement amount of the cursor and the magnifying direction is set by the direction of the selected arrow by the pattern generator 9. The arrow ⓐ denotes the magnification in the vertical direction (only the y coordinate is magnified so as to be vertically uniformly magnified). The arrow ⓑ indicates the magnification in the horizontal direction (only the x coordinate is magnified so as to be horizontally uniformly magnified). The arrow ⓒ represents the magnification in the horizontal and vertical directions (both of the x and y coordinates are magnified so as to be vertically and horizontally uniformly magnified). Practical examples are shown in FIGS. 9A, 9B, 9C, 9D, 9E, 9F, and 9G.

Figure 9A:
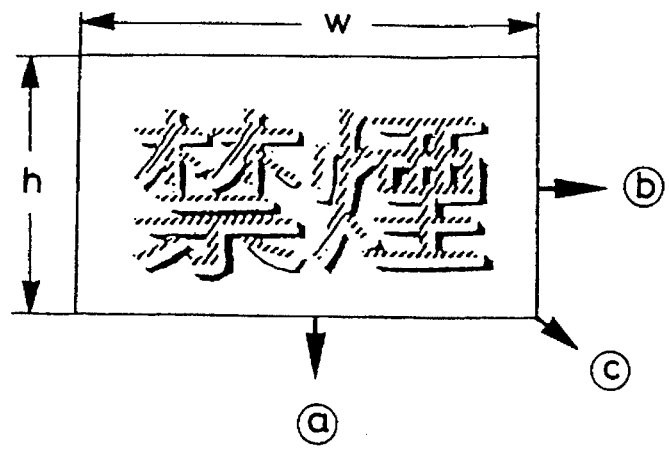
FIGS. 9A to 9M are diagrams showing examples in the case of actually performing the modifications.

FIG. 9A shows a state in which in a standard contour in which a hatching pattern  is designated into gray, the character train of 64 point having two continuous shadow planes which are designated to the white hatching pattern and black hatching pattern are clicked by using the pointing device, the process to magnify the characters is activated, and the character frame and the arrows of the respective directions are displayed.

In FIGS. 9B to 9G, a frame indicated by an alternate long and short dash line is shown to compare with the frame surrounding the character data of FIG. 9A.

Figure 9B:
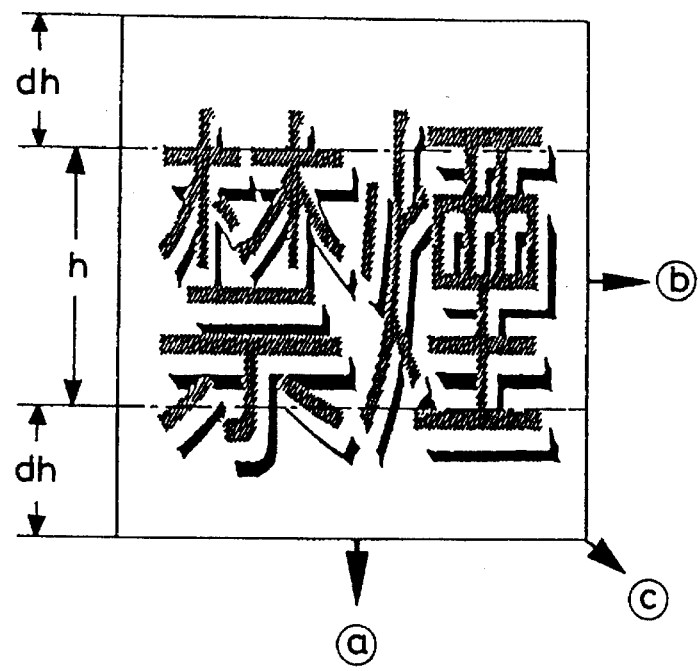

FIG. 9B shows the result (no hatching pattern is changed) in which the cursor was moved by only a distance dh on the arrow ⓐ in FIG. 9A in the direction of the arrow ⓐ by successively inputting the pointing device. Assuming that a height h=800 (dots) and a movement distance dh=400 (dots), the magnification in the direction of the y axis is set to $$\{h+(dh\times2)\}/h=\{800+(400\times2)\}/800=2.0 \text{ (times)}$$

Figure 9C:
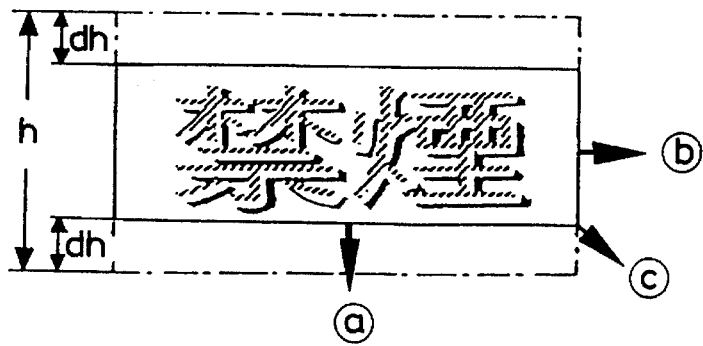
Figure 9D:
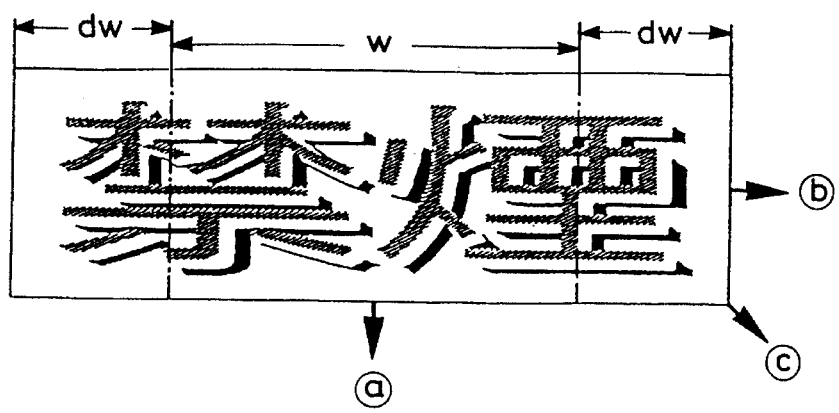
Figure 9E:
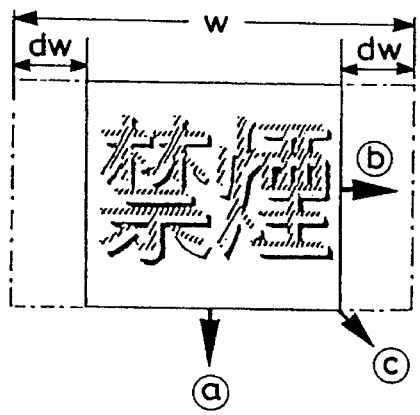
Figure 9F:
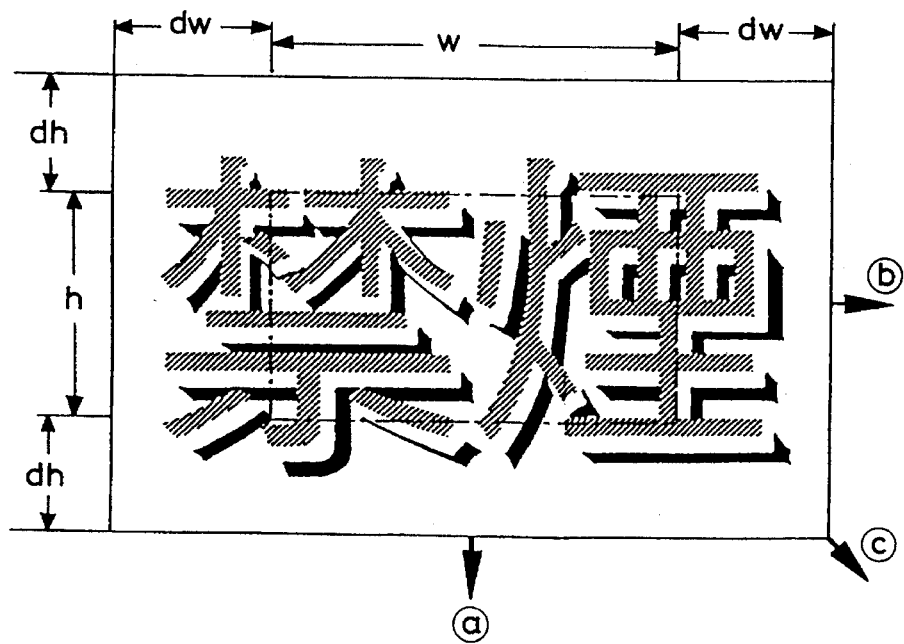
Figures 9G, 9H, 9I, 9J, 9K, 9L, 9M:
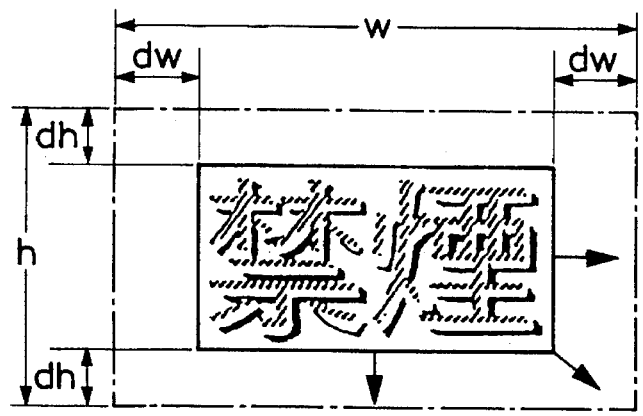

(Practical numerical values are shown in FIG. 9H.)

In a manner similar to the above, FIG. 9C shows the result in which the cursor was moved by the distance dh (=−140 dots) on the arrow ⓐ in FIG. 9A in the direction of the arrow ⓐ. The magnification in the y-axis direction is set to 0.65 time (FIG. 9I).

FIG. 9D shows the result in which the cursor was moved by dw (=600 dots) in the direction of the arrow ⓑ in FIG. 9A. FIG. 9E shows the result in which the cursor was moved by dw (=−210 dots) on the arrow ⓑ in the direction of the arrow ⓑ. Assuming that a width w=1200 dots, the magnifications in the x-axis direction are set to 2 and 0.65 times, respectively (FIGS. 9J and 9K).

FIG. 9F shows the result in which the cursor was moved by the distances dh (=400 dots) and dw (=450 dots) on the arrow ⓒ in FIG. 9 in the direction of the arrow ⓒ. However, since the magnifications are the same in which the vertical direction is used as a reference dw is ignored. Because of the dh (=400 dots), the magnifications in both directions of the x and y axes are set to 2 times. On the other hand, FIG. 9G shows the result in which the cursor was moved by dh (−140 dots) and dw (=−180 dots) on the arrow ⓒ in the direction of the arrow ⓒ. Because of the dh (=−140 dots), the magnifications in both directions of the x and y axes are set to 0.65. In this case, the horizontal magnification may be also used as a reference.

Figure 8:
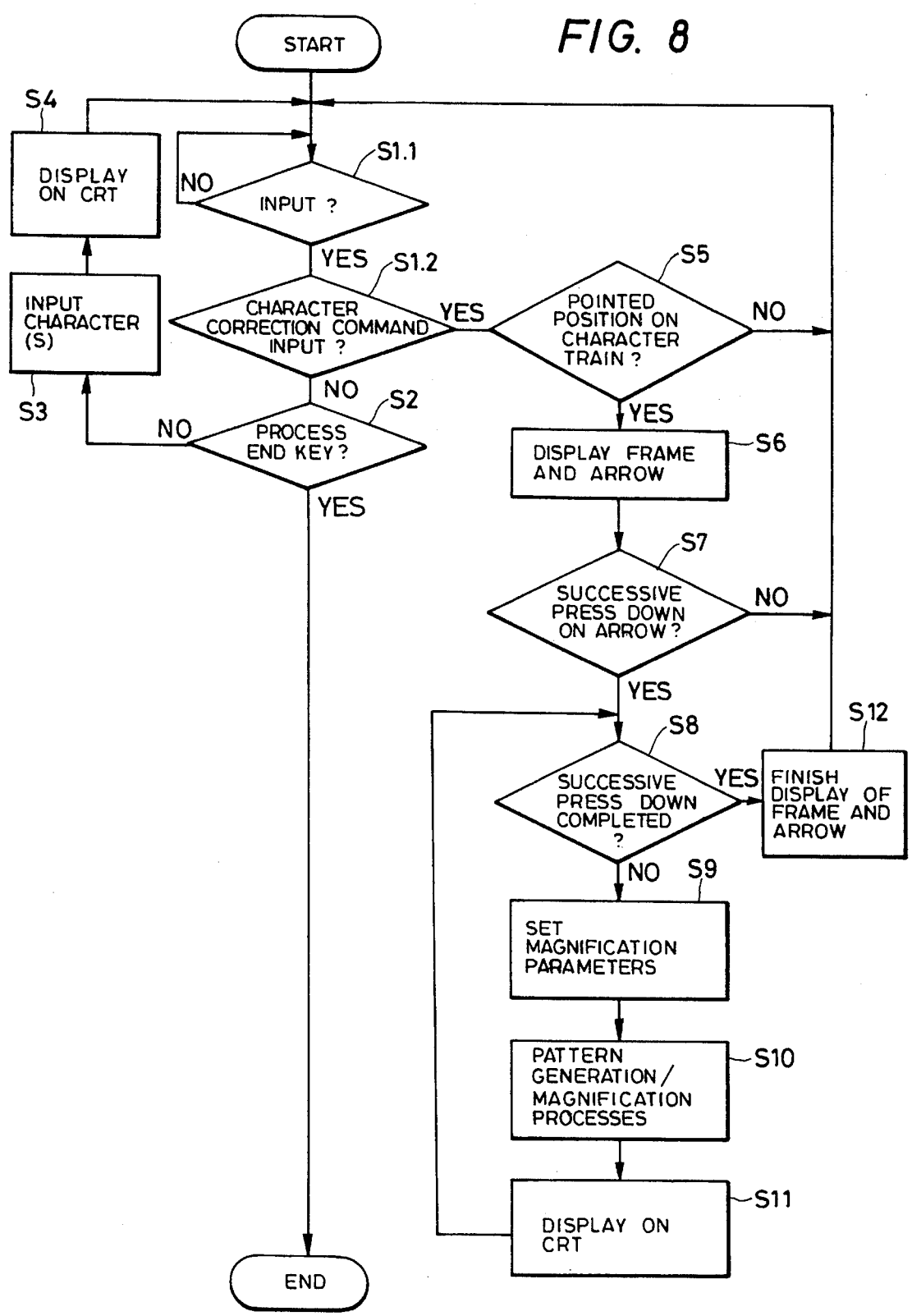
FIG. 8 is a flowchart according to a magnification of character data.

The magnifying process is repeated until the successive depression input in step S7 in FIG. 8 is finished (when the click button is released) (this is discriminated in step S8). Namely, the processes in which the magnification parameter is set in step S9 on the basis of the movement amount and moving direction of the cursor, the pattern is generated and the magnifying process is executed in step S10, and these data are displayed on the CRT 5 in step S11 are successively repeated.

If it is determined in step S8 that the successive depression has been finished, the magnifying process is finished. The display of the character frame and arrows is finished in step S12. Then, step S1 follows. The foregoing results of modifications (the numerical values shown in FIGS. 9H to 9M) are reflected to the pattern generator 9 shown in FIG. 1(a) and automatically updated. On the other hand, obviously, the original data (e.g., the standard pattern data shown in FIG. 2(a)) are also separately stored.

In the embodiment, the description has been made with regard to the magnification of only the character train. However, it is also possible to make a group with other figures such as a rectangle and to simultaneously perform the magnifying processes at the same ratio.

It is an essence of this arrangement that although character sizes must be generally designated by numerals for individual character trains to be magnified, they are once displayed by the CRT or the like and, thereafter, they can be designated (for example, the frame of the character train is enlarged or reduced) by the interactive procedure. The magnification data as shown in FIGS. 9H to 9L can be also displayed near the relevant character/figure by a window or the like in a realtime manner.

The present invention may be applied to a system consisting of a plurality of apparatuses or can be also applied to a single apparatus. On the other hand, a part of the apparatus of the system can be changed. The invention may be also applied to other systems or apparatuses through an LAN (Local Area Network).

(Industrial Applicability)

As described above, the present invention comprises: parameter memory means for storing type parameters to generate a plurality of type vector fonts; display means which can display a list of the plurality of type vector fonts on the basis of the type parameters stored in the parameter memory means; selecting means for selecting the plurality of type vector fonts displayed by the display means; and converting means for converting each vector font existing in a designated interval in a vector font train which are input from input means and displayed by the display means into the type vector fonts selected by the selecting means. Therefore, there are excellent advantages such that the type fonts which are frequently used can be previously displayed as a list, and without using conventional complicated parameter setting operations, by merely selecting the type font which is used in the simple operation, the parameter for the type font can be automatically set and the input character train can be efficiently designed and edited.

On the other hand, by easily setting the magnification and magnifying direction of the character data based on the vector font data by using the pointing device or the like, the character data can be dealt as a figure and the magnification of the character data can be set without the trial and error.

Further, the standard modified example of the vector font can be selected by a simple operation and, thereafter, by correcting it, a desired pattern can be easily obtained.

We claim:

1. A character processing apparatus comprising:

designating means for designating a desired one or more of a plurality of items of modification information for each graphic pattern in order to generate a plurality of graphic patterns;

parameter memory means for storing type parameters to generate a plurality of modified font patterns for all character patterns of a single font, the single font being represented by vector data, and the type parameters being based on the designated one or more items of modification information;

means for generating a request for display;

display means which can display a plurality of graphic patterns corresponding to the plurality of modified font patterns each corresponding to the same character of the single font on the basis of the type parameters stored in said parameter memory means in response to the request generated by said generating means;

selecting means for selecting one of the plurality of graphic patterns that correspond to the plurality of modified patterns that are displayed by said display means; and replacing means for replacing all character patterns existing in a designated area in a font train that have been input from an input means and displayed by said display means with a corresponding replacement character pattern based on the type parameters corresponding to the graphic pattern corresponding to the modified font pattern selected by said selecting means, wherein the character patterns in the designated area may be different from the one graphic pattern corresponding to the character pattern of the single font displayed by said display means.

2. A character processing apparatus according to claim 1, wherein arbitrary type parameters are registered into said parameter memory means by a user.

3. A character processing apparatus according to claim 2, wherein the corresponding replacement character patterns are formed on the basis of the arbitrary type parameters stored in said parameter memory means.

4. A character processing apparatus comprising:

designating means for designating a desired on or more of a plurality of items of modification information for each graphic pattern in order to generate a plurality of graphic patterns;

parameter memory means for storing parameters to generate a plurality of modified font patterns for all character patterns of a single font, the parameters being based on the designated one or more items of modification information;

means for generating a request for display;

display means which can display a plurality of graphic patterns corresponding to a plurality of modified font patterns each corresponding to the same character pattern of the single font on the basis of the parameters stored in said parameter memory means in response to the request generated by said generating means, wherein the one character pattern of the single font has been predetermined;

selecting means for selecting one of the plurality of graphic patterns that correspond to the plurality of modified font patterns displayed by said display means; and control means for controlling said display means such that the one graphic pattern corresponding to the modified font pattern selected by said selecting means is displayed distinguishably from other graphic patterns corresponding to the other modified font patterns.

5. A character processing apparatus according to claim 4, wherein arbitrary type parameters are registered into said parameter memory means by a user.

6. A character processing apparatus according to claim 5, wherein corresponding replacement character patterns are formed on the basis of the arbitrary type parameters stored in said parameter memory means.

7. A character processing apparatus according to claim 4, wherein the parameters previously selected are maintained.

8. A character processing apparatus comprising:

designating means for designating a desired one or more of a plurality of items of modification information for each graphic pattern in order to generate a plurality of graphic patterns;

means for displaying inputted characters and graphic patterns corresponding to modified character patterns of the inputted characters corresponding to different parameters, the parameters being based on the designated one or more items of modification information; and means for changing a pattern of at least one desired inputted character on the basis of a parameter corresponding to a desired character pattern from the graphic patterns corresponding to the character patterns, wherein the parameters include hatching, tilting and shadow modifications.

9. An apparatus according to claim 8, wherein the parameters comprise information for modifying inputted characters.

10. An apparatus according to claim 9, wherein the graphic patterns corresponding to the character patterns represent a variety of kinds of the modifying information.

11. An apparatus according to claim 10, wherein the graphic patterns corresponding to the character patterns represent various modifications of the same character.

12. An apparatus according to claim 8, wherein the graphic patterns corresponding to the character patterns comprise dot patterns based on vector data.

13. An apparatus according to claim 8, further comprising means for instructing said display means to display one of the inputted characters and the graphic patterns corresponding to the character patterns at one time.

14. An apparatus according to claim 13, wherein the parameters comprise information for modifying inputted characters.

15. An apparatus according to claim 14, wherein the graphic patterns corresponding to the character patterns represent a variety of kinds of the modifying information.

16. An apparatus according to claim 15, wherein the graphic patterns corresponding to the character patterns represent various modifications of the same character.

17. An apparatus according to claim 13, wherein the graphic patterns corresponding to the character patterns comprise dot patterns based on vector data.

18. An apparatus according to claim 8, further comprising means for designating the at least one desired inputted character and the desired character pattern from the graphic patterns corresponding to the character patterns.

19. An apparatus according to claim 18, wherein the parameters comprise information for modifying inputted characters.

20. An apparatus according to claim 19, wherein the graphic patterns corresponding to the character patterns represent a variety of kinds of the modifying information.

21. An apparatus according to claim 20, wherein the graphic patterns corresponding to the character patterns represent various modifications of the same character.

22. An apparatus according to claim 18, wherein the graphic patterns corresponding to the character patterns comprise dot patterns based on vector data.

23. An apparatus according to claim 8, wherein the at least one desired inputted character is displayed distinguishably from other inputted characters.

24. An apparatus according to claim 23, wherein the parameters comprise information for modifying inputted characters.

25. An apparatus according to claim 24, wherein the graphic patterns corresponding to the character patterns represent a variety of kinds of the modifying information.

26. An apparatus according to claim 25, wherein the graphic patterns corresponding to the character patterns represent various modifications of the same character.

27. An apparatus according to claim 23, wherein the graphic patterns corresponding to the character patterns comprise dot patterns based on vector data.

28. A character processing method applicable to an apparatus which stores type parameters to generate a plurality of modified font patterns for all characters of a single font, said method comprising the steps of:

designating a desired one or more of a plurality of items of modification information for each graphic pattern in order to generate a plurality of graphic patterns, the type parameters being based on the designated one or more items of modification information;

generating a request for display;

displaying a plurality of graphic patterns corresponding to the plurality of modified font patterns each corresponding to the same character pattern of the single font on the basis of the type parameters stored in the apparatus in response to said request generating step;

selecting one of the plurality of graphic patterns that correspond to the plurality of modified font patterns displayed in said displaying step; and replacing all character patterns existing in a designated area in a font train that have been input and displayed with a corresponding replacement character pattern based on the type parameters corresponding to the graphic pattern corresponding to the modified font pattern selected in said selecting step, wherein the character patterns in the designating area may be different from the one graphic pattern corresponding to the character pattern of the single font displayed in said displaying step.

29. A character processing method according to claim 28, wherein arbitrary type parameters are registered in said apparatus by a user.

30. A character processing method according to claim 29, wherein the corresponding replacement character patterns are formed on the basis of stored arbitrary type parameters.

31. A character processing method applicable to an apparatus which stores parameters to generate a plurality of modified font patterns for all character patterns of a single font, said method comprising the steps of:

designating a desired one or more of a plurality of items of modification information for each graphic pattern in order to generate a plurality of graphic patterns, the parameters being based on the designated one or more items of modification information;

generating a request for display;

displaying a plurality of graphic patterns corresponding to a plurality of modified font patterns each corresponding to the same character of the single font on the basis of the parameters stored in the apparatus in response to said request generating step, wherein the one character pattern of the single font is predetermined;

selecting one of the plurality of graphic patterns that correspond to the plurality of modified font patterns for the one character pattern displayed in said displaying step; and controlling said display step such that the one graphic pattern corresponding to the modified font pattern selected in said selecting step is displayed in said displaying step distinguishably from other graphic patterns corresponding to the other modified font patterns.

32. A character processing method according to claim 31, wherein arbitrary type parameters are registered in said apparatus by a user.

33. A character processing method according to claim 32, wherein corresponding replacement character patterns are formed on the basis of stored arbitrary type parameters.

34. A character processing method according to claim 31, wherein the parameters previously selected are maintained.

35. A character processing method comprising the steps of:

designating a desired one or more of a plurality of items of modification information for each graphic pattern in order to generate a plurality of graphic patterns;

displaying inputted characters and graphic patterns corresponding to modified character patterns of the inputted characters corresponding to different parameters, the parameters being based on the designated one or more items of modification information; and changing a pattern of at least one desired inputted character on the basis of a parameter corresponding to a desired character from the graphic patterns corresponding to the character patterns, wherein the parameters include hatching, tilting and shadow modifications.

36. A method according to claim 35, wherein the parameters comprise information for modifying inputted characters.

37. A method according to claim 36, wherein the graphic patterns corresponding to the character patterns represent a variety of kinds of modifying information.

38. A method according to claim 37, wherein the graphic patterns corresponding to the character patterns represent various modifications of the same character.

39. A method according to claim 35, wherein the graphic patterns corresponding to the character patterns comprise dot patterns based on vector data.

40. A method according to claim 35, further comprising the step of instructing the display of one of the inputted characters and the graphic patterns corresponding to the character patterns at one time.

41. A method according to claim 40, wherein the parameters comprise information for modifying inputted characters.

42. A method according to claim 41, wherein the graphic patterns corresponding to the character patterns represent a variety of kinds of modifying information.

43. A method according to claim 42, wherein the graphic patterns corresponding to the character patterns represent various modifications of the same character.

44. A method according to claim 40, wherein the graphic patterns corresponding to the character patterns comprise dot patterns based on vector data.

45. A method according to claim 35, further comprising the step of designating the at least one desired inputted character and the desired character pattern from the graphic patterns corresponding to the character patterns.

46. A method according to claim 45, wherein the parameters comprise information for modifying inputted characters.

47. A method according to claim 46, wherein the graphic patterns corresponding to the character patterns represent a variety of kinds of modifying information.

48. A method according to claim 47, wherein the graphic patterns corresponding to the character patterns represent various modifications of the same character.

49. A method according to claim 45, wherein the graphic patterns corresponding to the character patterns comprise dot patterns based on vector data.

50. A method according to claim 35, wherein the at least one desired inputted character is displayed distinguishably from other inputted characters.

51. A method according to claim 50, wherein the parameters comprise information for modifying inputted characters.

52. A method according to claim 51, wherein the graphic patterns corresponding to the character patterns represent a variety of kinds of modifying information.

53. A method according to claim 52, wherein the graphic patterns corresponding to the character patterns represent various modifications of the same character.

54. A method according to claim 50, wherein the graphic patterns corresponding to the character patterns comprise dot patterns based on vector data.

* * * * *

UNITED STATES PATENT AND TRADEMARK OFFICE
CERTIFICATE OF CORRECTION

PATENT NO. : 5,579,416
DATED : November 26, 1996
INVENTOR(S) : Shibuya et al.

It is certified that error appears in the above-indentified patent and that said Letters Patent is hereby corrected as shown below:

COLUMN 2:

Line 51, "time-such" should read --time such--.

COLUMN 7:

Line 52, "point" should read --points--.

COLUMN 8:

Line 22, "reference" should read --reference,--.

COLUMN 10:

Line 9, "on" should read --one--.

Signed and Sealed this

Eighth Day of April, 1997

Attest:

BRUCE LEHMAN

Attesting Officer    Commissioner of Patents and Trademarks